US012598567B2

(12) United States Patent
Yuan et al.

(10) Patent No.: US 12,598,567 B2
(45) Date of Patent: Apr. 7, 2026

(54) USER EQUIPMENT SUPPORT FOR TRACKING TIMING OF NON-SERVING CELLS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/574,552

(22) PCT Filed: Aug. 24, 2021

(86) PCT No.: PCT/CN2021/114201
§ 371 (c)(1),
(2) Date: Dec. 27, 2023

(87) PCT Pub. No.: WO2023/023922
PCT Pub. Date: Mar. 2, 2023

(65) Prior Publication Data
US 2024/0323876 A1 Sep. 26, 2024

(51) Int. Cl.
*H04W 56/00* (2009.01)

(52) U.S. Cl.
CPC ................................. *H04W 56/002* (2013.01)

(58) Field of Classification Search
None
See application file for complete search history.

(56) References Cited

U.S. PATENT DOCUMENTS

| 2011/0263254 A1 | 10/2011 | Nader |
| 2011/0286376 A1 | 11/2011 | Yoo et al. |
| 2013/0308481 A1 | 11/2013 | Kazmi et al. |
| 2017/0156108 A1 | 6/2017 | Kim |
| 2017/0374661 A1 | 12/2017 | Aiba et al. |
| 2019/0268725 A1 | 8/2019 | Edge et al. |
| 2019/0349867 A1 | 11/2019 | Molavianjazi et al. |

(Continued)

FOREIGN PATENT DOCUMENTS

| CN | 104754607 A | 7/2015 |
| CN | 110719630 A | 1/2020 |
| CN | 111771363 A | 10/2020 |

OTHER PUBLICATIONS

Supplementary European Search Report—EP21954470—Search Authority—The Hague—Mar. 12, 2025.

(Continued)

*Primary Examiner* — Angela Nguyen
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station associated with a serving cell, an indication of support for simultaneously tracking timing for a first number of non-serving cells having different respective reception timings. The UE may receive, from the base station, an indication to track timing for a second number of the non-serving cells having different respective reception timings, the second number being less than or equal to the first number. Numerous other aspects are provided.

30 Claims, 10 Drawing Sheets

(56) References Cited

U.S. PATENT DOCUMENTS

| | | | |
|---|---|---|---|
| 2020/0146107 A1 | 5/2020 | Xiong et al. | |
| 2020/0267683 A1* | 8/2020 | Edge | G01S 13/767 |
| 2020/0367195 A1 | 11/2020 | Selvaganapathy et al. | |
| 2022/0225257 A1* | 7/2022 | Laselva | H04W 56/0095 |
| 2022/0417885 A1* | 12/2022 | Dai | H04W 56/0045 |

OTHER PUBLICATIONS

International Search Report and Written Opinion—PCT/CN2021/114201—ISA/EPO—May 25, 2022.

* cited by examiner

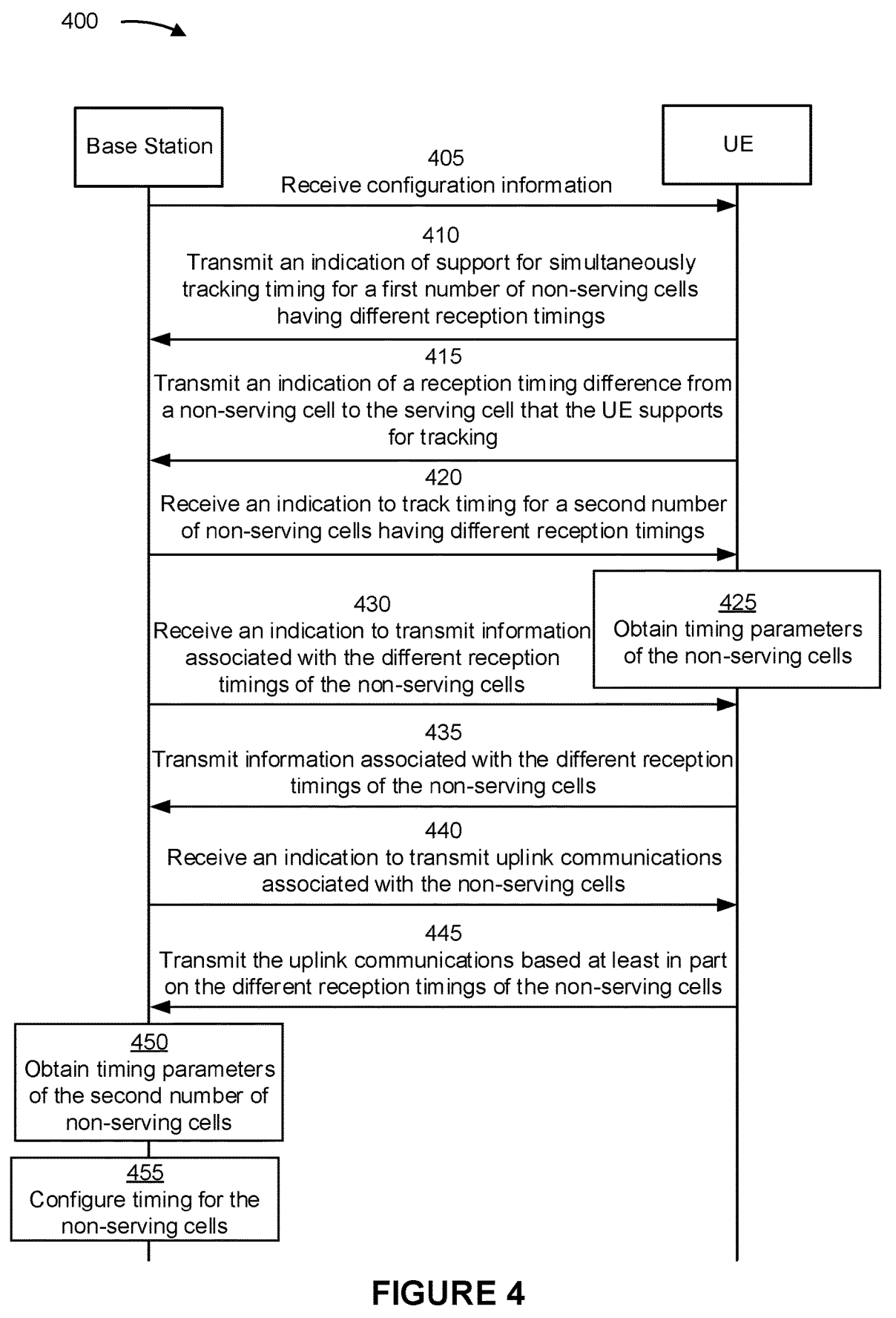

400

| Base Station | | UE |
|---|---|---|

405
Receive configuration information

410
Transmit an indication of support for simultaneously tracking timing for a first number of non-serving cells having different reception timings 415
Transmit an indication of a reception timing difference from a non-serving cell to the serving cell that the UE supports for tracking 420
Receive an indication to track timing for a second number of non-serving cells having different reception timings 430
Receive an indication to transmit information associated with the different reception timings of the non-serving cells 425
Obtain timing parameters of the non-serving cells 435
Transmit information associated with the different reception timings of the non-serving cells 440
Receive an indication to transmit uplink communications associated with the non-serving cells 445
Transmit the uplink communications based at least in part on the different reception timings of the non-serving cells 450
Obtain timing parameters of the second number of non-serving cells 455
Configure timing for the non-serving cells

FIGURE 4

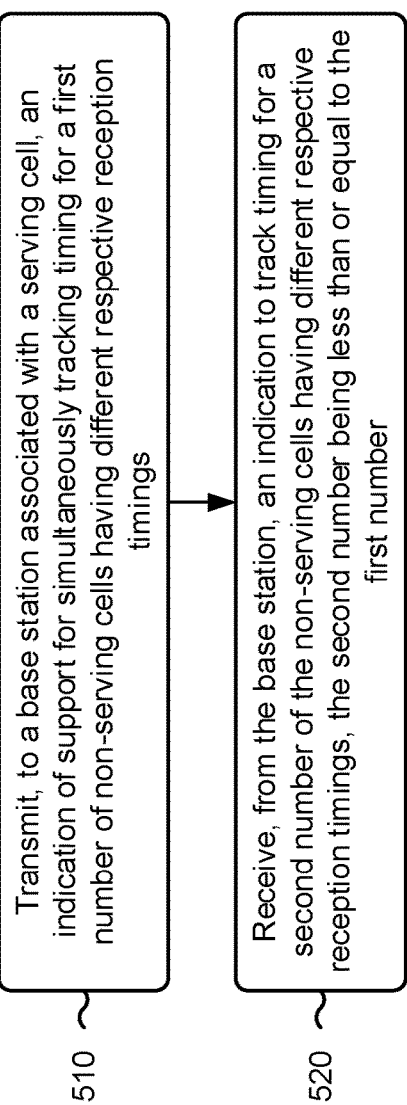

Transmit, to a base station associated with a serving cell, an indication of support for simultaneously tracking timing for a first number of non-serving cells having different respective reception timings

510

Receive, from the base station, an indication to track timing for a second number of the non-serving cells having different respective reception timings, the second number being less than or equal to the first number

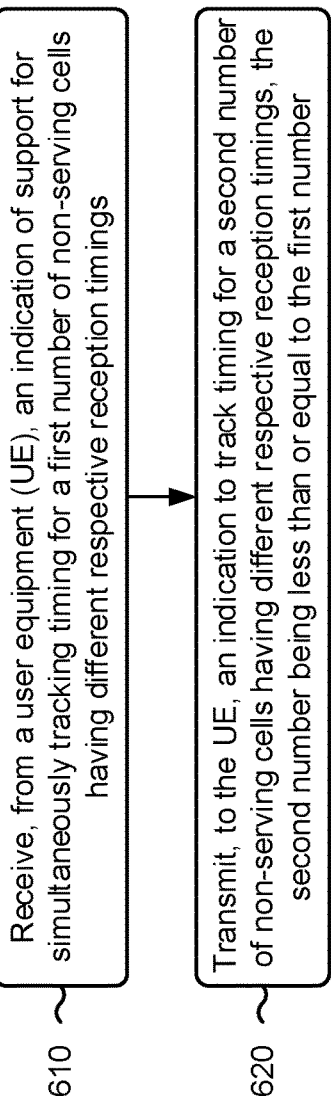

Receive, from a user equipment (UE), an indication of support for simultaneously tracking timing for a first number of non-serving cells having different respective reception timings

610

Transmit, to the UE, an indication to track timing for a second number of non-serving cells having different respective reception timings, the second number being less than or equal to the first number

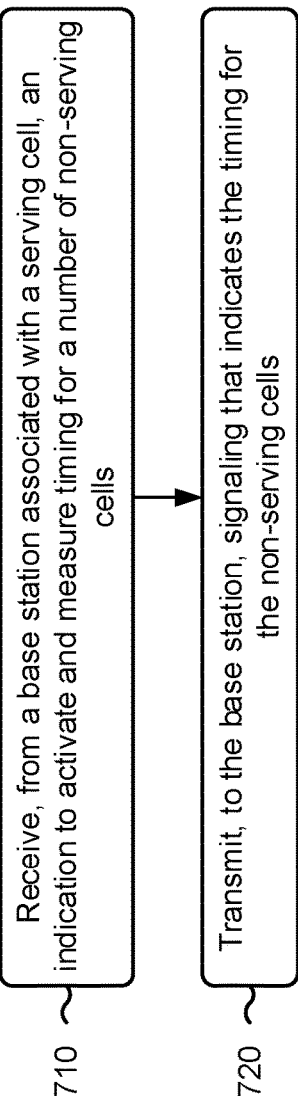
Receive, from a base station associated with a serving cell, an indication to activate and measure timing for a number of non-serving cells
Transmit, to the base station, signaling that indicates the timing for the non-serving cells
710
720
700
FIGURE 7

810    Transmit, to a user equipment (UE) via a serving cell, an indication to activate and measure timing for a number of non-serving cells 820    Receive, from the UE, signaling that indicates the timing for the non-serving cells

800

USER EQUIPMENT SUPPORT FOR TRACKING TIMING OF NON-SERVING CELLS

CROSS-REFERENCE TO RELATED APPLICATION

This application is a 371 national stage application of PCT Application No. PCT/CN2021/114201, filed on Aug. 24, 2021, entitled "USER EQUIPMENT SUPPORT FOR TRACKING TIMING OF NON-SERVING CELLS," which is hereby expressly incorporated by reference herein.

FIELD OF THE DISCLOSURE

Aspects of the present disclosure generally relate to wireless communication and specifically, to techniques and apparatuses for user equipment support for tracking timing of non-serving cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some networks, a UE may be configured to measure timing for non-serving cells for inter-cell layer 1 or layer 2 mobility or for inter-cell beam management. For example, the UE may measure the non-serving cells to determine whether a handover process should be initiated based at least in part on improved channel conditions for a connection via a non-serving cell. However, UEs may be configured with different capabilities for simultaneously tracking timing for non-serving cells having different respective reception timings (for example, different reception timings that are outside of a cyclic prefix timing window of a serving cell). Based at least in part on UEs being configured with different capabilities for simultaneously tracking timing for non-serving cells, the UE and a base station associated with the serving cell may become unsynchronized regarding UE tracking of the non-serving cells. This may cause the UE and the base station to consume power, network, communication, or computing resources to attempt to perform a handover with mismatched information or to handover the UE to a non-serving cell with an inferior link to the UE.

SUMMARY

Some aspects described herein relate to a method of wireless communication performed by a user equipment (UE). The method may include transmitting, to a base station associated with a serving cell, an indication of support for simultaneously tracking timing for a first number of non-serving cells having different respective reception timings. The method may include receiving, from the base station, an indication to track timing for a second number of the non-serving cells having different respective reception timings, the second number being less than or equal to the first number.

Some aspects described herein relate to a method of wireless communication performed by a base station. The method may include receiving, from a UE, an indication of support for simultaneously tracking timing for a first number of non-serving cells having different respective reception timings. The method may include transmitting, to the UE, an indication to track timing for a second number of non-serving cells having different respective reception timings, the second number being less than or equal to the first number.

Some aspects described herein relate to a method of wireless communication performed by a UE. The method may include receiving, from a base station associated with a serving cell, an indication to activate and measure timing for a number of non-serving cells. The method may include transmitting, to the base station, signaling that indicates the timing for the non-serving cells.

Some aspects described herein relate to a method of wireless communication performed by a base station. The method may include transmitting, to a UE via a serving cell, an indication to activate and measure timing for a number of non-serving cells. The method may include receiving, from the UE, signaling that indicates the timing for the non-serving cells.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to transmit, to a base station associated with a serving cell, an indication of support for simultaneously tracking timing for a first number of non-serving cells having different respective reception timings. The processor-readable code, when executed by the at least one processor, may be configured to cause the user equipment to receive, from the base station, an indication to track timing for a second number of the non-serving cells having different respective reception timings, the second number being less than or equal to the first number.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to receive, from a UE, an indication of support for simultaneously tracking timing for a first number of non-serving cells having different respective reception timings. The processor-readable code, when executed by the at least one processor, may be configured to cause the base station to transmit, to the UE, an indication to track timing for a second number of non-serving cells having different respective reception timings, the second number being less than or equal to the first number.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive, from a base station associated with a serving cell, an indication to activate and measure timing for a number of non-serving cells. The processor-readable code, when executed by the at least one processor, may be configured to cause the UE to transmit, to the base station, signaling that indicates the timing for the non-serving cells.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit, to a UE via a serving cell, an indication to activate and measure timing for a number of non-serving cells. The processor-readable code, when executed by the at least one processor, may be configured to cause the base station to receive, from the UE, signaling that indicates the timing for the non-serving cells.

Some aspects described herein relate to a non-transitory computer-readable medium that stores a set of instructions for wireless communication by a UE. The set of instructions, when executed by one or more processors of the UE, may cause the UE to transmit, to a base station associated with a serving cell, an indication of support for simultaneously tracking timing for a first number of non-serving cells having different respective reception timings. The set of instructions, when executed by one or more processors of the UE, may cause the UE to receive, from the base station, an indication to track timing for a second number of the non-serving cells having different respective reception timings, the second number being less than or equal to the first number.

Some aspects described herein relate to a non-transitory computer-readable medium that stores a set of instructions for wireless communication by a base station. The set of instructions, when executed by one or more processors of the base station, may cause the base station to receive, from a UE, an indication of support for simultaneously tracking timing for a first number of non-serving cells having different respective reception timings. The set of instructions, when executed by one or more processors of the base station, may cause the base station to transmit, to the UE, an indication to track timing for a second number of non-serving cells having different respective reception timings, the second number being less than or equal to the first number.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to receive, from a base station associated with a serving cell, an indication to activate and measure timing for a number of non-serving cells. The set of instructions, when executed by one or more processors of the one or more instructions that, when executed by one or more processors of a UE, may cause the one or more instructions that, when executed by one or more processors of a UE to transmit, to the base station, signaling that indicates the timing for the non-serving cells.

Some aspects described herein relate to a non-transitory computer-readable medium that stores a set of instructions for wireless communication by a base station. The set of instructions, when executed by one or more processors of the base station, may cause the base station to transmit, to a UE via a serving cell, an indication to activate and measure timing for a number of non-serving cells. The set of instructions, when executed by one or more processors of the base station, may cause the base station to receive, from the UE, signaling that indicates the timing for the non-serving cells.

Some aspects described herein relate to an apparatus for wireless communication. The apparatus may include means for transmitting, to a base station associated with a serving cell, an indication of support for simultaneously tracking timing for a first number of non-serving cells having different respective reception timings. The apparatus may include means for receiving, from the base station, an indication to track timing for a second number of the non-serving cells having different respective reception timings, the second number being less than or equal to the first number.

Some aspects described herein relate to an apparatus for wireless communication. The apparatus may include means for receiving, from a UE, an indication of support for simultaneously tracking timing for a first number of non-serving cells having different respective reception timings. The apparatus may include means for transmitting, to the UE, an indication to track timing for a second number of non-serving cells having different respective reception timings, the second number being less than or equal to the first number.

Some aspects described herein relate to an apparatus for wireless communication. The apparatus may include means for receiving, from a base station associated with a serving cell, an indication to activate and measure timing for a number of non-serving cells. The apparatus may include means for transmitting, to the base station, signaling that indicates the timing for the non-serving cells.

Some aspects described herein relate to an apparatus for wireless communication. The apparatus may include means for transmitting, to a UE via a serving cell, an indication to activate and measure timing for a number of non-serving cells. The apparatus may include means for receiving, from the UE, signaling that indicates the timing for the non-serving cells.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with user equipment support for tracking timing of non-serving cells in accordance with the present disclosure.

FIG. 5 is a flowchart illustrating an example process performed, for example, by a UE in accordance with the present disclosure.

FIG. 6 is a flowchart illustrating an example process performed, for example, by a base station in accordance with the present disclosure.

FIG. 7 is a flowchart illustrating an example process performed, for example, by a UE in accordance with the present disclosure.

DETAILED DESCRIPTION

Figure 1:
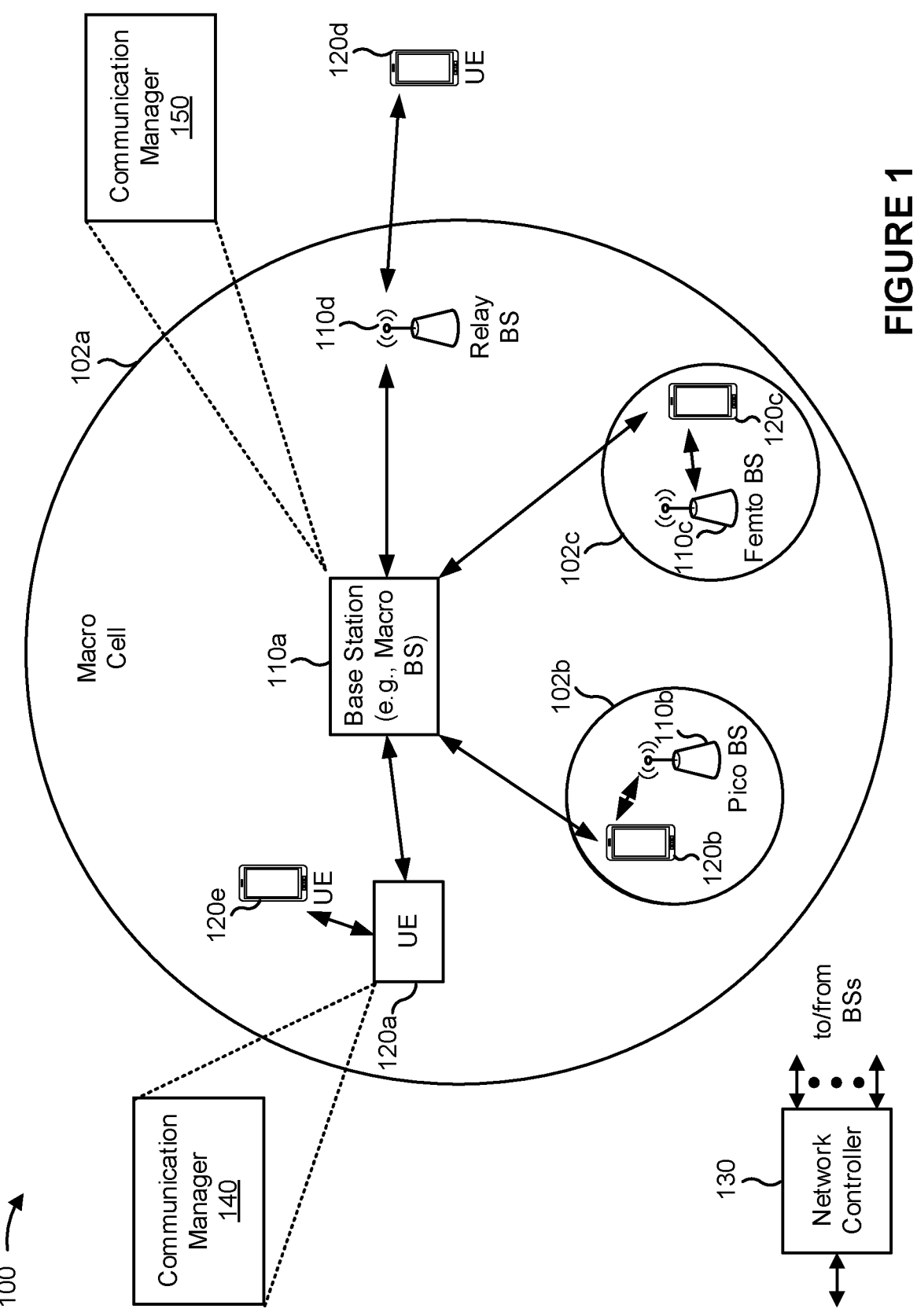
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to user equipment support for tracking timing of non-serving cells. Some aspects more specifically relate to a user equipment (UE) transmitting, to a base station, an indication of support for simultaneously tracking (for example, monitoring in a period) timing for a first number of non-serving cells having different reception timings (e.g., different respective reception timings). In some aspects, the UE may receive an indication to track timing for a second number of the non-serving cells having different reception timings (e.g., different respective reception timings), with the second number being based at least in part on the first number. For example, the second number may be less than or equal to the first number. In some aspects, the UE may transmit signaling that indicates the timing for the non-serving cells. For example, the UE may transmit a report that indicates cell identifications of the non-serving cells or reception timing differences of the non-serving cells from the serving cells. Additionally or alternatively, the signaling may include uplink transmissions that are transmitted based at least in part on the different reception timings for the non-serving cells. The base station may determine the different reception timings for the non-serving cells from the signaling. In some aspects, the base station may configure the non-serving cells to operate with a same timing (for example, timing advance) or to operate with cell-specific timings.

Particular aspects of the subject matter described in this disclosure can be implemented to realize one or more of the following potential advantages. In some examples, the described techniques can be used to improve communications of indications of timing of non-serving cells (for example, for layer 1 or layer 2 mobility) between the base station and the UE. For example, the UE may be configured to provide timing tracking and or provide timing information for a number of non-serving cells, with the number being based at least in part on a capability of the UE. In this way, the UE and the base station may be synchronized regarding UE tracking of the non-serving cells or the UE and base station may conserve power, network, communication, or computing resources that may have otherwise been used to attempt to perform a handover with mismatched information or to handover the UE to a non-serving cell with an inferior link to the UE.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHZ," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a base station associated with a serving cell, an indication of support for simultaneously tracking timing for a first number of non-serving cells having different respective reception timings; and receive, from the base station, an indication to track timing for a second number of the non-serving cells having different respective reception timings, the second number being less than or equal to the first number. Additionally or alternatively, the communication manager 140 may perform one or more other operations described herein.

In some aspects, the base station 110 may include a communication manager 150. As described in more detail elsewhere herein, the communication manager 150 may receive, from a UE, an indication of support for simultaneously tracking timing for a first number of non-serving cells having different respective reception timings; and transmit, to the UE, an indication to track timing for a second number of non-serving cells having different respective reception timings, the second number being less than or equal to the first number. Additionally or alternatively, the communication manager 150 may perform one or more other operations described herein.

In some aspects, the UE 120 may include a communication manager 140. As described in more detail elsewhere herein, the communication manager 140 may receive, from a base station associated with a serving cell, an indication to activate and measure timing for a number of non-serving cells; and transmit, to the base station, signaling that indicates the timing for the non-serving cells. Additionally or alternatively, the communication manager 140 may perform one or more other operations described herein.

In some aspects, the base station 110 may include a communication manager 150. As described in more detail elsewhere herein, the communication manager 150 may transmit, to a UE via a serving cell, an indication to activate and measure timing for a number of non-serving cells; and receive, from the UE, signaling that indicates the timing for the non-serving cells. Additionally or alternatively, the communication manager 150 may perform one or more other operations described herein.

Figure 2:
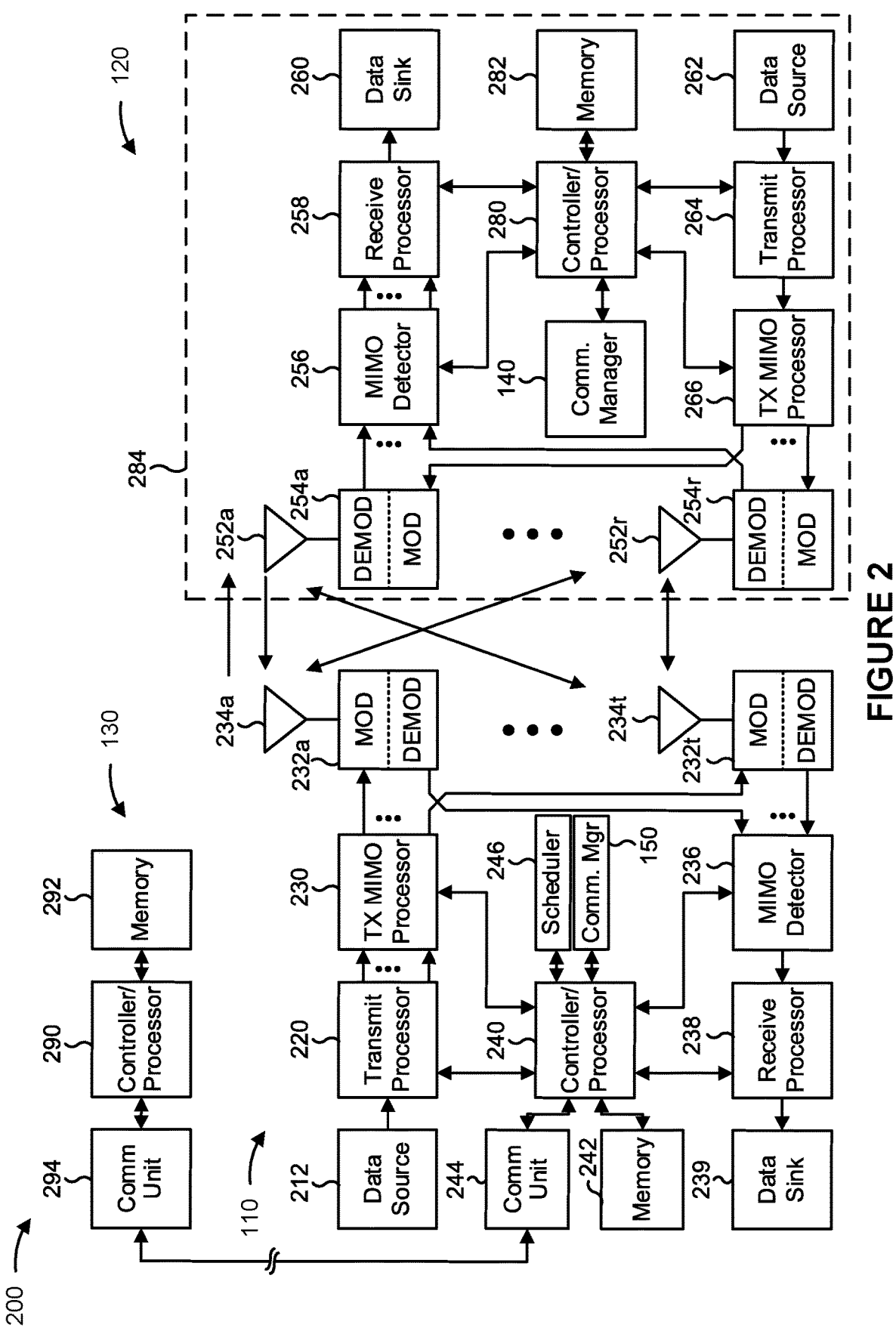
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with user equipment support for tracking timing of non-serving cells, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE includes means for transmitting, to a base station associated with a serving cell, an indication of support for simultaneously tracking timing for a first number of non-serving cells having different respective reception timings; or means for receiving, from the base station, an indication to track timing for a second number of the non-serving cells having different respective reception timings, the second number being less than or equal to the first number. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE, an indication of support for simultaneously tracking timing for a first number of non-serving cells having different respective reception timings; or means for transmitting, to the UE, an indication to track timing for a second number of non-serving cells having different respective reception timings, the second number being less than or equal to the first number. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving, from a base station associated with a serving cell, an indication to activate and measure timing for a number of non-serving cells; or means for transmitting, to the base station, signaling that indicates the timing for the non-serving cells. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE via a serving cell, an indication to activate and measure timing for a number of non-serving cells; or means for receiving, from the UE, signaling that indicates the timing for the non-serving cells. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
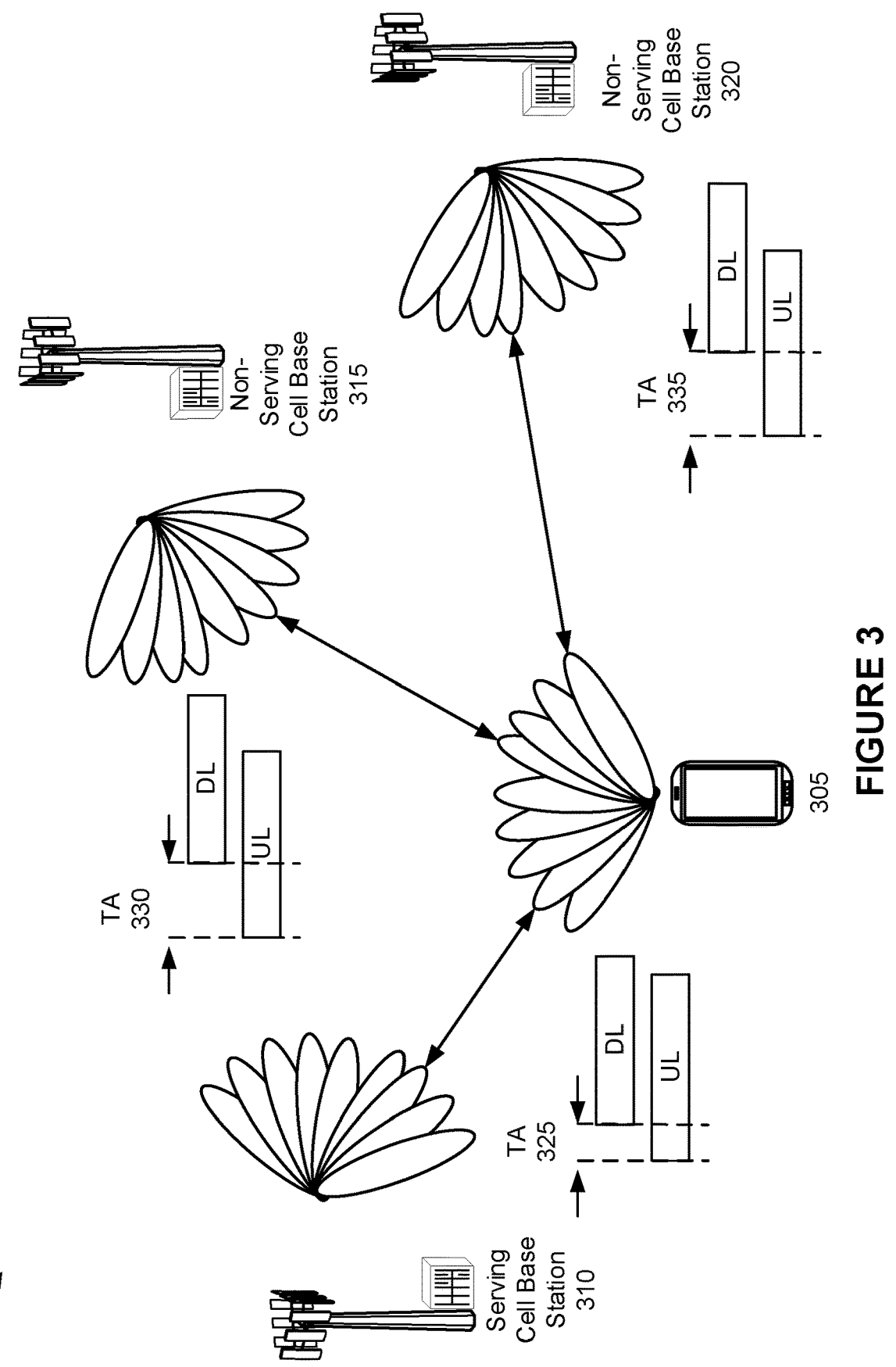
FIG. 3 is a diagram illustrating an example of attempting to track timing for non-serving cells in accordance with the present disclosure.

FIG. 3 is a diagram illustrating an example 300 of attempting to track timing for non-serving cells in accordance with the present disclosure. As shown in FIG. 3, a UE 305 (for example, UE 120) may communicate with a serving cell base station 310 (for example, base station 110), a serving cell base station 315 (for example, base station 110), or a serving cell base station 320 (for example, base station 110) (collectively referred to as the "base stations"). In some aspects, the base stations and the UE 305 may be part of a wireless network (for example, wireless network 100). The UE 305 and the serving cell base station 310 may have established a wireless connection prior to operations shown in FIG. 4.

As shown in FIG. 3, the UE 305 may communicate with (for example, transmit signaling to or receive signaling from) the base stations using different beams of the UE 305 (for example, associated with different transmission configuration indicator (TCI) states). Links between the UE 305 and the base stations may have different timing advances. For example, a link between the serving cell base station 310 and the UE 305 may have a timing advance 325 that is relatively small based at least in part on a propagation time of a beam path between the serving cell base station 310 and the UE 305. A link between the non-serving cell base station 315 and the UE 305 may have a timing advance 330 that is larger than the timing advance 325 based at least in part on a propagation time of a beam path between the non-serving cell base station 315 and the UE 305. A link between the non-serving cell base station 320 and the UE 305 may have a timing advance 335 that is larger than the timing advance 325 based at least in part on a propagation time of a beam path between the non-serving cell base station 320 and the UE 305.

A timing advance indicates an amount of time by which the UE 305 is to transmit an uplink signal to a base station before a time that the UE 305 would have configured for reception of a downlink signal if a downlink signal were scheduled at the same time. For example, the UE determines a timing of beginnings of radio access network (RAN)-based timing units (for example, slots or symbols) based at least in part on timing of reception of downlink signals. The UE determines, or receives an indication of, an amount of time (the timing advance) by which an uplink transmission is to be transmitted in advance of beginnings of the RAN-based timing units that are based at least in part on reception of downlink signals.

In some networks, a UE may be configured to measure timing for non-serving cells for inter-cell layer 1 or layer 2 mobility. For example, the UE may measure the non-serving cells to determine whether a handover process should be initiated based at least in part on improved channel conditions for a connection via a non-serving cell. However, UEs may be configured with different capabilities for simultaneously tracking timing for non-serving cells having different respective reception timings (for example, different reception timings that are outside of a cyclic prefix timing window of a serving cell). Based at least in part on UEs being configured with different capabilities for simultaneously tracking timing for non-serving cells, the UE and a base station associated with the serving cell may become unsynchronized regarding UE tracking of the non-serving cells. This may cause the UE and the base station to consume power, network, communication, or computing resources to attempt to perform a handover with mismatched information or to handover the UE to a non-serving cell with an inferior link to the UE.

In some aspects described herein, a UE may transmit, to a base station, an indication of support for simultaneously tracking (for example, monitoring) timing for a first number of non-serving cells having different respective reception timings. In some aspects, the UE may receive an indication to track timing for a second number of the non-serving cells having different respective reception timings, with the second number being based at least in part on the first number. For example, the second number may be less than or equal to the first number. In some aspects, the UE may transmit signaling that indicates the timing for the non-serving cells. For example, the UE may transmit a report that indicates cell identifications of the non-serving cells or reception timing differences of the non-serving cells from the serving cells.

Additionally or alternatively, the signaling may include uplink transmissions that are transmitted based at least in part on the different reception timings for the non-serving cells. The base station may determine the different reception timings for the non-serving cells from the signaling. In some aspects, the base station may configure the non-serving cells to operate with a same timing (for example, timing advance) or to operate with cell-specific timings.

In some examples, the described techniques can be used to improve communications of indications of timing of non-serving cells between the base station and the UE. For example, the UE may be configured to provide timing tracking and or provide timing information for a number of non-serving cells, with the number being based at least in part on a capability of the UE. In this way, the UE and the base station may be synchronized regarding UE tracking of the non-serving cells, and the UE and base station may conserve power, network, communication, or computing resources that may have otherwise been used to attempt to perform a handover with mismatched information or to handover the UE to a non-serving cell with an inferior link to the UE.

FIG. 4 is a diagram illustrating an example 400 associated with user equipment support for tracking timing of non-serving cells, in accordance with the present disclosure. As shown in FIG. 4, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 4. The base station and the UE may be associated with a serving cell.

In a first operation shown by reference number 405, the base station may transmit, and the UE may receive, configuration information. In some aspects, the UE may receive the configuration information via one or more of radio resource control (RRC) signaling, medium access control (MAC) control elements (MAC CEs), or downlink control information (DCI), among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to transmit an indication of support (for example, based at least in part on a capability) for simultaneously tracking timing for a first number of non-serving cells having different reception timings (e.g., different respective reception timings). In some aspects, the configuration information may indicate that the UE is to transmit an indication of a reception timing difference (for example, based at least in part on a timing advance difference) that the UE supports for simultaneous monitoring of non-serving cells. In some aspects, the configuration information may indicate that the UE is to transmit information associated with the different reception timings (e.g., different respective reception timings), of the non-serving cells. In some aspects, the configuration information may indicate that the UE is to transmit uplink communications, based at least in part on an indication from the base station, with timing that is based at least in part on the different reception timings of the non-serving cells (for example, based at least in part on the timing advances of the non-serving cells).

The UE may configure itself based at least in part on the configuration information. In some aspects, the UE may be configured to perform one or more operations described herein based at least in part on the configuration information.

In a second operation shown by reference number 410, the UE may transmit, and the base station may receive, an indication of support for simultaneously tracking timing for a first number of non-serving cells having different reception timings (e.g., different respective reception timings). In some aspects, the UE may transmit the indication of support via RRC signaling (for example, as part of an RRC connection process).

In a third operation shown by reference number 415, the UE may transmit, and the base station may receive, an indication of a reception timing difference from a non-serving cell to the serving cell that the UE supports for tracking. For example, the UE may indicate that the UE supports tracking a non-serving cell only if communications with the non-serving cell are associated with a reception timing difference that is within 2 cyclic prefixes (for example, as configured for the serving cell) of the reception timing of the serving cell. In some aspects, the UE may transmit an indication of support for simultaneously tracking timing for a first number of non-serving cells having different reception timings (e.g., different respective reception timings).

A reception timing difference supported by the UE for tracking may be based at least in part on components of the UE, available computing resources of the UE, power resources of the UE, or available antenna groups of the UE. In some aspects, the UE may transmit the indication of the reception timing difference from the non-serving cell to the serving cell that the UE supports for tracking via RRC signaling (for example, as part of an RRC connection process). In some aspects, the first number of non-serving cells having different reception timings is based at least in part on a maximum number of non-serving cells for which the UE supports simultaneous tracking.

The non-serving cells having different reception timings may include non-serving cells having a reception timing difference from a serving cell that is larger than a cyclic prefix duration of the serving cell, a configured value (for example, configured in a communication protocol or RRC signaling, among other examples). For example, if a non-serving cell has a reception timing difference from a serving cell that is within the cyclic prefix duration of the serving cell, the non-serving cell may be considered to have a same reception timing as the serving cell. In some aspects, the non-serving cells include a TRP associated with the base station (for example, having a same cell identification or physical cell identification as the base station), a TRP associated with an additional base station that is different from the base station (for example, having a different cell identification or physical cell identification as the base station), or the additional base station (for example, having a different cell identification or physical cell identification as the base station), among other examples.

In some aspects, the UE may transmit the indication described in connection with reference number 415 in a same communication or a same set of communications as the indication described in connection with reference number 410.

In a fourth operation shown by reference number 420, the UE may receive, and the base station may transmit, an indication to track timing for a second number of non-serving cells having different reception timings (e.g., different respective reception timings). Non-serving cells of the second number of non-serving cells having different reception timings may have different reception timings from others of the second number of non-serving cells and/or different reception timings from reception timings of the first number of non-serving cells. In some aspects, the second number of non-serving cells having different reception timings indicates a number of non-serving cells to monitor, without regard to particular reception timings (e.g., based at least in part on the reception timings being different from each other and/or the serving cell reception timing). In some aspects, the second number is based at least in part on the first number. For example, the second number may be less than or equal to the first number based at least in part on the UE indicating that the UE supports simultaneous tracking of at most the first number of non-serving cells having different timing (for example, timing advance or reception timing). In some aspects, the indication includes an indication to activate and measure timing for the second number of non-serving cells.

In a fifth operation shown by reference number 425, the UE may obtain timing parameters of the second number of the non-serving cells. For example, the UE may track or monitor the timing parameters of a number of the non-serving cells based at least in part on the indication from the base station as described in connection with reference number 420.

In a sixth operation shown by reference number 430, the UE may receive, and the base station may transmit, an indication to transmit information associated with the different reception timings of the non-serving cells. For example, the base station may transmit an indication for the UE to transmit signaling that indicates the timing for the non-serving cells. The indication may indicate a type of signaling to indicate the timing for the non-serving cells, as described below.

In a seventh operation shown by reference number 435, the UE may transmit, and the base station may receive, information associated with the different reception timings of the non-serving cells. For example, the UE may transmit information associated with the different reception timings of one or more of the non-serving cells that the UE tracks based at least in part on the indication from the base station described in connection with reference number 420. In some aspects, the information comprises, for a non-serving cell of the non-serving cells, an indication of a cell identification of the non-serving cell or an indication of a reception timing difference from the serving cell, among other examples. In some aspects, the information comprises, for each of the non-serving cells, an indication of a cell identification of the non-serving cell or an indication of a reception timing difference from the serving cell, among other examples.

In some aspects, the UE transmits the information associated with the different reception timings of the non-serving cells based at least in part on receiving the indication to transmit information associated with the different reception timings of the non-serving cells, as described in connection with reference number 425. In some aspects, the UE transmits the information associated with the different reception timings of the non-serving cells independently from (for example, in the absence of) receiving the indication to transmit information associated with the different reception timings of the non-serving cells.

In some aspects, the UE may transmit the information within a report. The report may include indications of cell identifications of the non-serving cells or reception timing differences of the non-serving cells from the serving cell, among other examples.

In an eighth operation shown by reference number 440, the UE may receive, and the base station may transmit, an indication to transmit uplink communications associated with the non-serving cells. For example, the indication to transmit the signaling that indicates the timing for the non-serving cells may indicate that the UE is to transmit uplink communications associated with the non-serving cells.

In a ninth operation shown by reference number 445, the UE may transmit, and the base station may receive, the uplink communications based at least in part on the different reception timings of the non-serving cells. In some aspects, the UE may transmit uplink transmissions transmitted based at least in part on the different reception timings for the non-serving cells.

In a tenth operation shown by reference number 450, the base station may obtain timing parameters of the second number of non-serving cells. In some aspects, the base station may obtain the timing parameters of the second number of non-serving cells based at least in part on decoding the information associated with the different reception timings of the non-serving cells. In some aspects, the base station may obtain the timing parameters of the second number of non-serving cells based at least in part on timing of reception the uplink transmissions that were transmitted by the UE based at least in part on the different reception timings for the non-serving cells.

In an eleventh operation shown by reference number 455, the base station may configure timing for the non-serving cells. In some aspects, the base station may transmit configuration information to base stations associated with the non-serving cells. The base station may configure the non-serving cells to have a same timing advance (for example, as observed by the UE). Alternatively, the base station may configure the non-serving cells to have different reception timings (for example, cell-specific timing advances).

In this way, the UE and the base station may be synchronized regarding UE tracking of the non-serving cells or the UE and base station may conserve power, network, communication, or computing resources that may have otherwise been used to attempt to perform a handover with mismatched information or to handover the UE to a non-serving cell with an inferior link to the UE.

FIG. 5 is a flowchart illustrating an example process 500 performed, for example, by a UE in accordance with the present disclosure. Example process 500 is an example where the UE (for example, UE 120) performs operations associated with UE support for tracking timing of non-serving cells.

As shown in FIG. 5, in some aspects, process 500 may include transmitting, to a base station associated with a serving cell, an indication of support for simultaneously tracking timing for a first number of non-serving cells having different respective reception timings (block 510). For example, the UE (such as by using communication manager 140 or transmission component 904, depicted in FIG. 9) may transmit, to a base station associated with a serving cell, an indication of support for simultaneously tracking timing for a first number of non-serving cells having different respective reception timings, as described above.

As further shown in FIG. 5, in some aspects, process 500 may include receiving, from the base station, an indication to track timing for a second number of the non-serving cells having different respective reception timings, the second number being less than or equal to the first number (block 520). For example, the UE (such as by using communication manager 140 or reception component 902, depicted in FIG. 9) may receive, from the base station, an indication to track timing for a second number of the non-serving cells having different respective reception timings, the second number being less than or equal to the first number, as described above.

Process 500 may include additional aspects, such as any single aspect or any combination of aspects described below or in connection with one or more other processes described elsewhere herein.

In a first additional aspect, the first number of the non-serving cells having different respective reception timings is based at least in part on a maximum number of the non-serving cells for which the UE supports simultaneous tracking.

In a second additional aspect, alone or in combination with the first aspect, the non-serving cells having different respective reception timings comprise non-serving cells having a reception timing difference from a serving cell that is larger than a cyclic prefix duration of the serving cell or a predetermined value.

In a third additional aspect, alone or in combination with one or more of the first and second aspects, the non-serving cells comprise one or more of a transmission reception point associated with the base station, a transmission reception point associated with an additional base station that is different from the base station, or the additional base station.

In a fourth additional aspect, alone or in combination with one or more of the first through third aspects, process 500 includes transmitting, to the base station, an indication of a reception timing difference from a non-serving cell to the serving cell that the UE supports for tracking.

In a fifth additional aspect, alone or in combination with one or more of the first through fourth aspects, process 500 includes transmitting, to the base station, information associated with the different reception timings of the non-serving cells.

In a sixth additional aspect, alone or in combination with one or more of the first through fifth aspects, process 500 includes receiving an indication to transmit the information associated with the different reception timings of the non-serving cells.

In a seventh additional aspect, alone or in combination with one or more of the first through sixth aspects, the information comprises, for a non-serving cell of the non-serving cells, one or more of an indication of a cell identification of the non-serving cell, or an indication of a reception timing difference from the serving cell.

In an eighth additional aspect, alone or in combination with one or more of the first through seventh aspects, process 500 includes receiving, from the base station, an indication to transmit uplink communications associated with the non-serving cells, and transmitting the uplink communications based at least in part on the different reception timings for the non-serving cells.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

FIG. 6 is a flowchart illustrating an example process 600 performed, for example, by a base station in accordance with the present disclosure. Example process 600 is an example where the base station (for example, base station 110) performs operations associated with user equipment support for tracking timing of non-serving cells.

As shown in FIG. 6, in some aspects, process 600 may include receiving, from a UE, an indication of support for simultaneously tracking timing for a first number of non-serving cells having different respective reception timings (block 610). For example, the base station (such as by using communication manager 150 or reception component 1002, depicted in FIG. 10) may receive, from a UE, an indication of support for simultaneously tracking timing for a first number of non-serving cells having different respective reception timings, as described above.

As further shown in FIG. 6, in some aspects, process 600 may include transmitting, to the UE, an indication to track timing for a second number of non-serving cells having different respective reception timings, the second number being less than or equal to the first number (block 620). For example, the base station (such as by using communication manager 150 or transmission component 1004, depicted in FIG. 10) may transmit, to the UE, an indication to track timing for a second number of non-serving cells having different respective reception timings, the second number being less than or equal to the first number, as described above.

Process 600 may include additional aspects, such as any single aspect or any combination of aspects described below or in connection with one or more other processes described elsewhere herein.

In a first additional aspect, the first number of non-serving cells having different respective reception timings is based at least in part on a maximum number of non-serving cells for which the UE supports simultaneous tracking.

In a second additional aspect, alone or in combination with the first aspect, non-serving cells having different respective reception timings comprise non-serving cells having a reception timing difference from a serving cell that is larger than a cyclic prefix duration of the serving cell or a predetermined value.

In a third additional aspect, alone or in combination with one or more of the first and second aspects, the non-serving cells comprise one or more of a transmission reception point associated with the base station, a transmission reception point associated with an additional base station that is different from the base station, or the additional base station.

In a fourth additional aspect, alone or in combination with one or more of the first through third aspects, process 600 includes receiving, from the UE, an indication of a reception timing difference from a non-serving cell to the serving cell that the UE supports for tracking.

In a fifth additional aspect, alone or in combination with one or more of the first through fourth aspects, process 600 includes receiving, from the UE, information associated with the different reception timings of the non-serving cells.

In a sixth additional aspect, alone or in combination with one or more of the first through fifth aspects, process 600 includes transmitting an indication to transmit the information associated with the different reception timings of the non-serving cells.

In a seventh additional aspect, alone or in combination with one or more of the first through sixth aspects, the information comprises, for a non-serving cell of the non-serving cells, one or more of an indication of a cell identification of the non-serving cell, or an indication of a reception timing difference from the serving cell.

In an eighth additional aspect, alone or in combination with one or more of the first through seventh aspects, process 600 includes transmitting, to the UE, an indication to transmit uplink communications associated with the non-serving cells, and receiving the uplink communications to determine the timing for the non-serving cells.

In a ninth additional aspect, alone or in combination with one or more of the first through eighth aspects, process 600 includes transmitting, to one or more base stations associated with the non-serving cells, an indication of a same timing advance to use for subsequent communications, or transmitting, to one or more base stations associated with the non-serving cells, an indication to use cell-specific timing advances for the subsequent communications.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a UE in accordance with the present disclosure. Example process 700 is an example where the UE (for example, UE 120) performs operations associated with user equipment support for tracking timing of non-serving cells.

As shown in FIG. 7, in some aspects, process 700 may include receiving, from a base station associated with a serving cell, an indication to activate and measure timing for a number of non-serving cells (block 710). For example, the UE (such as by using communication manager 140 or reception component 902, depicted in FIG. 9) may receive, from a base station associated with a serving cell, an indication to activate and measure timing for a number of non-serving cells, as described above.

As further shown in FIG. 7, in some aspects, process 700 may include transmitting, to the base station, signaling that indicates the timing for the non-serving cells (block 720). For example, the UE (such as by using communication manager 140 or transmission component 904, depicted in FIG. 9) may transmit, to the base station, signaling that indicates the timing for the non-serving cells, as described above.

Process 700 may include additional aspects, such as any single aspect or any combination of aspects described below or in connection with one or more other processes described elsewhere herein.

In a first additional aspect, process 700 includes transmitting an indication of support for simultaneously tracking timing for a supported number of the non-serving cells having different respective reception timings, wherein the number of the non-serving cells is less than or equal to the supported number of the non-serving cells.

In a second additional aspect, alone or in combination with the first aspect, the signaling comprises a report including one or more of indications of cell identifications of the non-serving cells, or reception timing differences of the non-serving cells from the serving cell.

In a third additional aspect, alone or in combination with one or more of the first and second aspects, the signaling comprises uplink transmissions transmitted based at least in part on the different reception timings for the non-serving cells.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
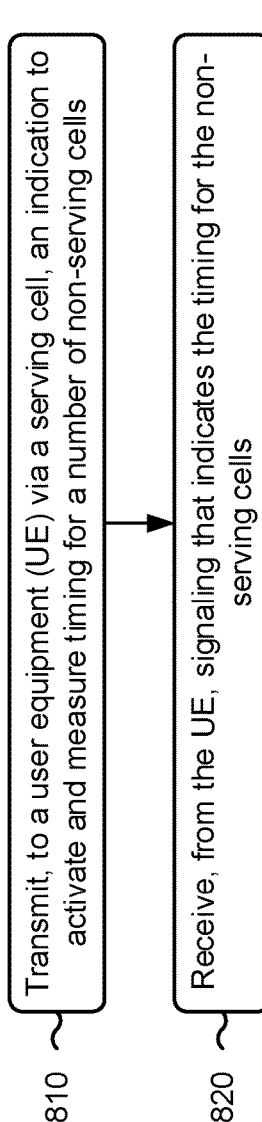
FIG. 8 is a flowchart illustrating an example process performed, for example, by a base station in accordance with the present disclosure.

FIG. 8 is a flowchart illustrating an example process 800 performed, for example, by a base station in accordance with the present disclosure. Example process 800 is an example where the base station (for example, base station 110)

performs operations associated with user equipment support for tracking timing of non-serving cells.

As shown in FIG. 8, in some aspects, process 800 may include transmitting, to a UE via a serving cell, an indication to activate and measure timing for a number of non-serving cells (block 810). For example, the base station (such as by using communication manager 150 or transmission component 1004, depicted in FIG. 10) may transmit, to a UE via a serving cell, an indication to activate and measure timing for a number of non-serving cells, as described above.

As further shown in FIG. 8, in some aspects, process 800 may include receiving, from the UE, signaling that indicates the timing for the non-serving cells (block 820). For example, the base station (such as by using communication manager 150 or reception component 1002, depicted in FIG. 10) may receive, from the UE, signaling that indicates the timing for the non-serving cells, as described above.

Process 800 may include additional aspects, such as any single aspect or any combination of aspects described below or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
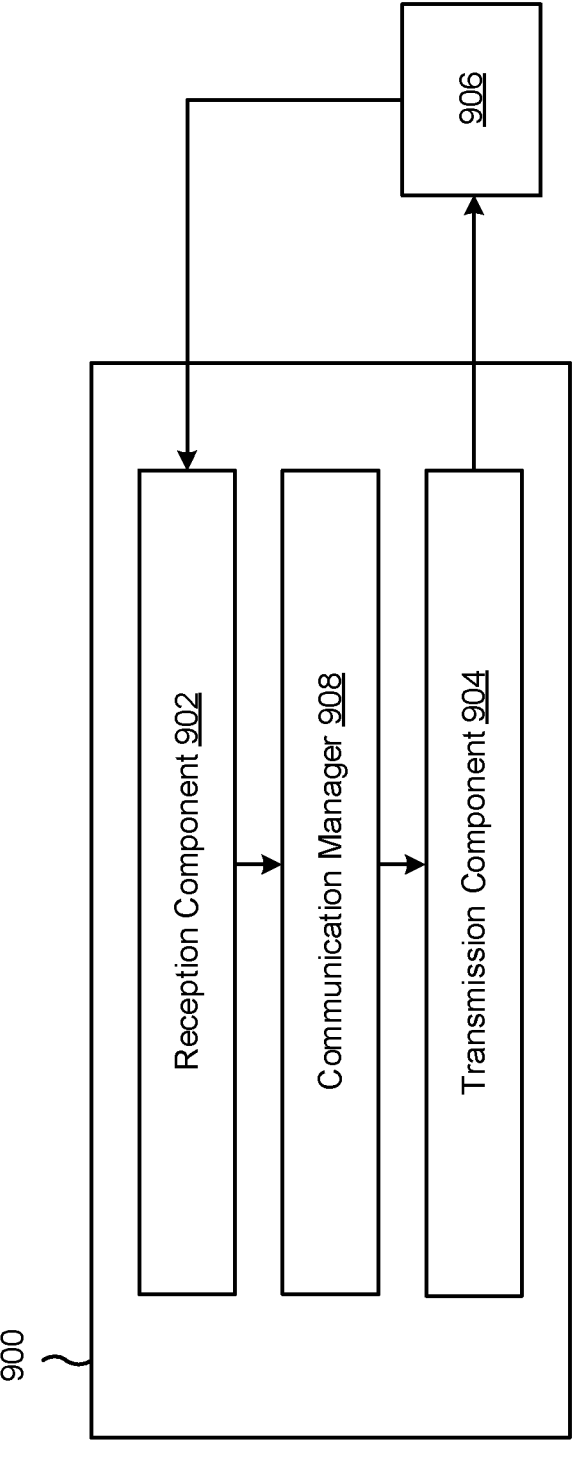
FIGS. 9 and 10 are diagrams of example apparatuses for wireless communication in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 908 (for example, communication manger 140), which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 4. Additionally or alternatively, the apparatus 900 may be configured to perform one or more processes described herein, such as process 500 of FIG. 5, process 700 of FIG. 7 or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 908 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 908 may transmit or may cause the transmission component 904 to transmit, to a base station associated with a serving cell, an indication of support for simultaneously tracking timing for a first number of non-serving cells having different respective reception timings. The communication manager 908 may receive or may cause the reception component 902 to receive, from the base station, an indication to track timing for a second number of the non-serving cells having different respective reception timings, the second number being less than or equal to the first number. In some aspects, the communication manager 908 may perform one or more operations described elsewhere herein as being performed by one or more components of the communication manager 140.

The communication manager 908 may receive or may cause the reception component 902 to receive, from a base station associated with a serving cell, an indication to activate and measure timing for a number of non-serving cells. The communication manager 908 may transmit or may cause the transmission component 904 to transmit, to the base station, signaling that indicates the timing for the non-serving cells. In some aspects, the communication manager 908 may perform one or more operations described elsewhere herein as being performed by one or more components of the communication manager 908.

The communication manager 908 may include a controller/processor, a memory, or a combination thereof, of the UE described above in connection with FIG. 2. In some aspects, the communication manager 908 includes a set of components, such as a determination component, a measuring component, or a combination thereof. Alternatively, the set of components may be separate and distinct from the communication manager 908. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit, to a base station associated with a serving cell, an indication of support for simultaneously tracking timing for a first number of non-serving cells having different respective reception timings. The reception component 902 may receive, from the base station, an indication to track timing for a second number of the non-serving cells having different respective reception timings, the second number being less than or equal to the first number.

The transmission component 904 may transmit, to the base station, an indication of a reception timing difference from a non-serving cell to the serving cell that the UE supports for tracking.

The transmission component 904 may transmit, to the base station, information associated with the different reception timings of the non-serving cells.

The reception component 902 may receive an indication to transmit the information associated with the different reception timings of the non-serving cells.

The reception component 902 may receive, from the base station, an indication to transmit uplink communications associated with the non-serving cells.

The transmission component 904 may transmit the uplink communications based at least in part on the different reception timings for the non-serving cells.

The reception component 902 may receive, from a base station associated with a serving cell, an indication to activate and measure timing for a number of non-serving cells. The transmission component 904 may transmit, to the base station, signaling that indicates the timing for the non-serving cells.

The transmission component 904 may transmit an indication of support for simultaneously tracking timing for a supported number of the non-serving cells having different respective reception timings wherein the number of the non-serving cells is less than or equal to the supported number of the non-serving cells.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
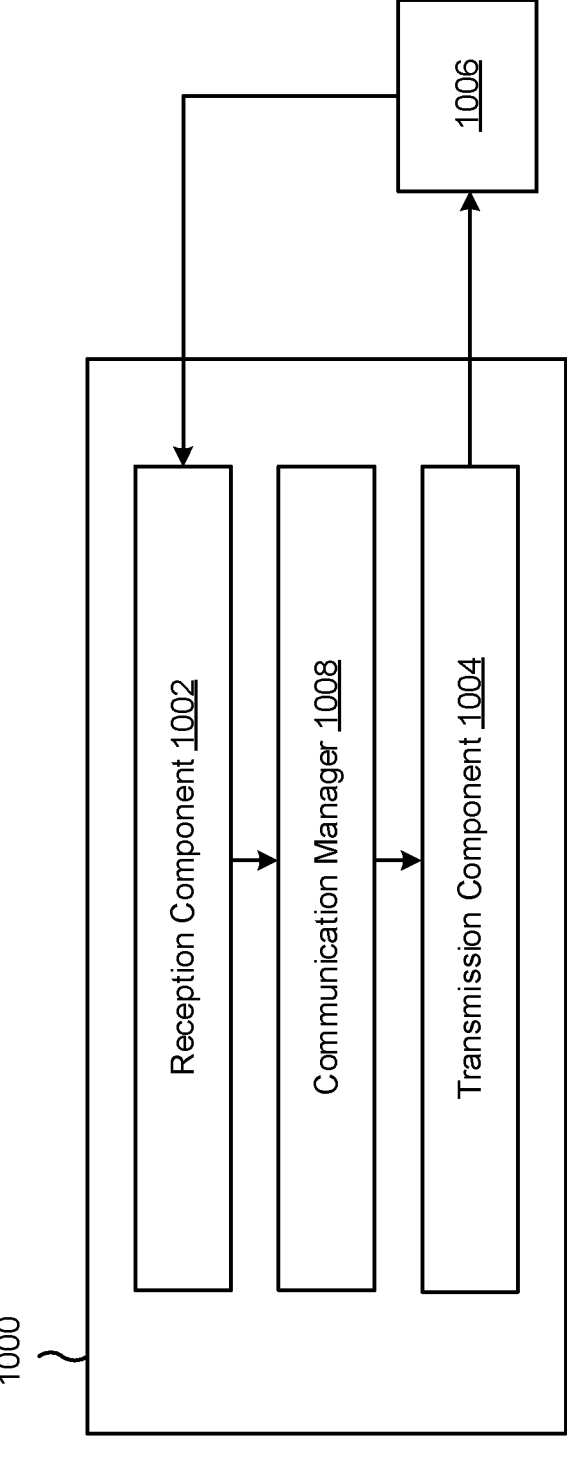

FIG. 10 is a diagram of an example apparatus 1000 for wireless communication in accordance with the present disclosure. The apparatus 1000 may be a base station, or a base station may include the apparatus 1000. In some aspects, the apparatus 1000 includes a reception component 1002, a transmission component 1004, and a communication manager 1008, which may be in communication with one another (for example, via one or more buses). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 4. Additionally or alternatively, the apparatus 1000 may be configured to perform one or more processes described herein, such as process 600 of FIG. 6, process 800 of FIG. 8, or a combination thereof. In some aspects, the apparatus 1000 may include one or more components of the base station described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 1008 (for example, communication manger 150). In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, the communication manager 1008 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The communication manager 1008 may receive or may cause the reception component 1002 to receive, from a UE, an indication of support for simultaneously tracking timing for a first number of non-serving cells having different respective reception timings. The communication manager 1008 may transmit or may cause the transmission component 1004 to transmit, to the UE, an indication to track timing for a second number of non-serving cells having different respective reception timings, the second number being less than or equal to the first number. In some aspects, the communication manager 1008 may perform one or more operations described elsewhere herein as being performed by one or more components of the communication manager 1008.

The communication manager 1008 may transmit or may cause the transmission component 1004 to transmit, to a UE via a serving cell, an indication to activate and measure timing for a number of non-serving cells. The communication manager 1008 may receive or may cause the reception component 1002 to receive, from the UE, signaling that indicates the timing for the non-serving cells. In some aspects, the communication manager 1008 may perform one or more operations described elsewhere herein as being performed by one or more components of the communication manager 150.

The communication manager 1008 may include a controller/processor, a memory, a scheduler, a communication unit, or a combination thereof, of the base station described above in connection with FIG. 2. In some aspects, the communication manager 1008 includes a set of components, such as determination component, a measuring component, or a combination thereof. Alternatively, the set of components may be separate and distinct from the communication manager 1008. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a UE, an indication of support for simultaneously tracking timing for a first number of non-serving cells having different respective reception timings. The transmission component 1004 may transmit, to the UE, an indication to track timing for a second number of non-serving cells having different respective reception timings, the second number being less than or equal to the first number.

The reception component 1002 may receive, from the UE, an indication of a reception timing difference from a non-serving cell to the serving cell that the UE supports for tracking.

The reception component 1002 may receive, from the UE, information associated with the different reception timings of the non-serving cells.

The transmission component 1004 may transmit an indication to transmit the information associated with the different reception timings of the non-serving cells.

The transmission component 1004 may transmit, to the UE, an indication to transmit uplink communications associated with the non-serving cells.

The reception component 1002 may receive the uplink communications to determine the timing for the non-serving cells.

The transmission component 1004 may transmit, to one or more base stations associated with the non-serving cells, an indication of a same timing advance to use for subsequent communications.

The transmission component 1004 may transmit, to one or more base stations associated with the non-serving cells, an indication to use cell-specific timing advances for the subsequent communications.

The transmission component 1004 may transmit, to a UE via a serving cell, an indication to activate and measure timing for a number of non-serving cells. The reception component 1002 may receive, from the UE, signaling that indicates the timing for the non-serving cells.

The reception component 1002 may receive an indication of support for simultaneously tracking timing for a supported number of the non-serving cells having different respective reception timings wherein the number of the non-serving cells is less than or equal to the supported number of the non-serving cells.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting, to a base station associated with a serving cell, an indication of support for simultaneously tracking timing for a first number of non-serving cells having different respective reception timings; and receiving, from the base station, an indication to track timing for a second number of the non-serving cells having different respective reception timings, the second number being less than or equal to the first number.

Aspect 2: The method of Aspect 1, wherein the first number of the non-serving cells having different respective reception timings is based at least in part on a maximum number of the non-serving cells for which the UE supports simultaneous tracking Aspect 3: The method of any of Aspects 1-2, wherein the non-serving cells having different respective reception timings comprise non-serving cells having a reception timing difference from a serving cell that is larger than a cyclic prefix duration of the serving cell.

Aspect 4: The method of any of Aspects 1-3, wherein the non-serving cells comprise one or more of: a transmission reception point associated with the base station, a transmission reception point associated with an additional base station that is different from the base station, or the additional base station.

Aspect 5: The method of any of Aspects 1-4, further comprising: transmitting, to the base station, an indication of a reception timing difference from a non-serving cell to the serving cell that the UE supports for tracking.

Aspect 6: The method of any of Aspects 1-5, further comprising: transmitting, to the base station, information associated with the different reception timings of the non-serving cells.

Aspect 7: The method of Aspect 6, further comprising: receiving an indication to transmit the information associated with the different reception timings of the non-serving cells.

Aspect 8: The method of any of Aspects 6-7, wherein the information comprises, for a non-serving cell of the non-serving cells, one or more of: an indication of a cell identification of the non-serving cell, or an indication of a reception timing difference from the serving cell.

Aspect 9: The method of any of Aspects 1-8, further comprising: receiving, from the base station, an indication to transmit uplink communications associated with the non-serving cells; and transmitting the uplink communications based at least in part on the different reception timings for the non-serving cells.

Aspect 10: A method of wireless communication performed by a base station, comprising: receiving, from a user equipment (UE), an indication of support for simultaneously tracking timing for a first number of non-serving cells having different respective reception timings; and transmitting, to the UE, an indication to track timing for a second number of non-serving cells having different respective reception timings, the second number being less than or equal to the first number.

Aspect 11: The method of Aspect 10, wherein the first number of non-serving cells having different respective reception timings is based at least in part on a maximum number of non-serving cells for which the UE supports simultaneous tracking.

Aspect 12: The method of any of Aspects 10-11, wherein non-serving cells having different respective reception timings comprise non-serving cells having a reception timing difference from a serving cell that is larger than a cyclic prefix duration of the serving cell.

Aspect 13: The method of any of Aspects 10-12, wherein the non-serving cells comprise one or more of: a transmission reception point associated with the base station, a transmission reception point associated with an additional base station that is different from the base station, or the additional base station.

Aspect 14: The method of any of Aspects 10-13, further comprising: receiving, from the UE, an indication of a reception timing difference from a non-serving cell to the serving cell that the UE supports for tracking.

Aspect 15: The method of any of Aspects 10-14, further comprising: receiving, from the UE, information associated with the different reception timings of the non-serving cells.

Aspect 16: The method of Aspect 15, further comprising: transmitting an indication to transmit the information associated with the different reception timings of the non-serving cells.

Aspect 17: The method of any of Aspects 15-16, wherein the information comprises, for a non-serving cell of the non-serving cells, one or more of: an indication of a cell identification of the non-serving cell, or an indication of a reception timing difference from the serving cell.

Aspect 18: The method of any of Aspects 10-17, further comprising: transmitting, to the UE, an indication to transmit uplink communications associated with the non-serving cells; and receiving the uplink communications to determine the timing for the non-serving cells.

Aspect 19: The method of Aspect 18, further comprising: transmitting, to one or more base stations associated with the non-serving cells, an indication of a same timing advance to use for subsequent communications, or transmitting, to one or more base stations associated with the non-serving cells, an indication to use cell-specific timing advances for the subsequent communications.

Aspect 20: A method of wireless communication performed by a user equipment (UE), comprising: receiving, from a base station associated with a serving cell, an indication to activate and measure timing for a number of non-serving cells; and transmitting, to the base station, signaling that indicates the timing for the non-serving cells.

Aspect 21: The method of Aspect 20, further comprising transmitting an indication of support for simultaneously tracking timing for a supported number of the non-serving cells having different respective reception timings, wherein the number of the non-serving cells is less than or equal to the supported number of the non-serving cells.

Aspect 22: The method of any of Aspects 20-21, wherein the signaling comprises a report including one or more of: indications of cell identifications of the non-serving cells, or reception timing differences of the non-serving cells from the serving cell Aspect 23: The method of any of Aspects 20-22, wherein the signaling comprises uplink transmissions transmitted based at least in part on the different reception timings for the non-serving cells.

Aspect 24: A method of wireless communication performed by a base station, comprising: transmitting, to a user equipment (UE) via a serving cell, an indication to activate and measure timing for a number of non-serving cells; and receiving, from the UE, signaling that indicates the timing for the non-serving cells.

Aspect 25: The method of Aspect 24, further comprising receiving an indication of support for simultaneously tracking timing for a supported number of the non-serving cells having different respective reception timings, wherein the number of the non-serving cells is less than or equal to the supported number of the non-serving cells.

Aspect 26: The method of any of Aspects 24-25, wherein the signaling comprises a report including one or more of: indications of cell identifications of the non-serving cells, or reception timing differences of the non-serving cells from the serving cell.

Aspect 27: The method of Aspect 24-26, wherein the signaling comprises uplink transmissions transmitted based at least in part on the different reception timings for the non-serving cells.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

a memory; and one or more processors, coupled to the memory, configured to:

transmit, to a base station associated with a serving cell, an indication of support for simultaneously tracking timing for a first number of non-serving cells having different respective reception timings; and receive, from the base station, an indication to track timing for a second number of the non-serving cells having different respective reception timings, the second number being less than or equal to the first number.

2. The UE of claim 1, wherein the first number of the non-serving cells having different respective reception timings is based at least in part on a maximum number of the non-serving cells for which the UE supports simultaneous tracking.

3. The UE of claim 1, wherein the non-serving cells having different respective reception timings comprise non-serving cells having a reception timing difference from a serving cell that is larger than a cyclic prefix duration of the serving cell.

4. The UE of claim 1, wherein the non-serving cells comprise one or more of:

a transmission reception point associated with the base station, a transmission reception point associated with an additional base station that is different from the base station, or the additional base station.

5. The UE of claim 1, wherein the one or more processors are further configured to:

transmit, to the base station, an indication of a reception timing difference from a non-serving cell to the serving cell that the UE supports for tracking.

6. The UE of claim 1, wherein the one or more processors are further configured to:

transmit, to the base station, information associated with the different reception timings of the non-serving cells.

7. The UE of claim 6, wherein the one or more processors are further configured to:

receive an indication to transmit the information associated with the different reception timings of the non-serving cells.

8. The UE of claim 6, wherein the information comprises, for a non-serving cell of the non-serving cells, one or more of:

an indication of a cell identification of the non-serving cell, or an indication of a reception timing difference from the serving cell.

9. The UE of claim 1, wherein the one or more processors are further configured to:

receive, from the base station, an indication to transmit uplink communications associated with the non-serving cells; and transmit the uplink communications based at least in part on the different reception timings for the non-serving cells.

10. A base station for wireless communication, comprising:

a memory; and one or more processors, coupled to the memory, configured to:

receive, from a user equipment (UE), an indication of support for simultaneously tracking timing for a first number of non-serving cells having different respective reception timings; and transmit, to the UE, an indication to track timing for a second number of non-serving cells having different respective reception timings, the second number being less than or equal to the first number.

11. The base station of claim 10, wherein the first number of non-serving cells having different respective reception timings is based at least in part on a maximum number of non-serving cells for which the UE supports simultaneous tracking.

12. The base station of claim 10, wherein non-serving cells having different respective reception timings comprise non-serving cells having a reception timing difference from a serving cell that is larger than a cyclic prefix duration of the serving cell.

13. The base station of claim 10, wherein the non-serving cells comprise one or more of:

a transmission reception point associated with the base station, a transmission reception point associated with an additional base station that is different from the base station, or the additional base station.

14. The base station of claim 10, wherein the one or more processors are further configured to:

receive, from the UE, an indication of a reception timing difference from a non-serving cell to the serving cell that the UE supports for tracking.

15. The base station of claim 10, wherein the one or more processors are further configured to:

receive, from the UE, information associated with the different reception timings of the non-serving cells.

16. The base station of claim 15, wherein the one or more processors are further configured to:

transmit an indication to transmit the information associated with the different reception timings of the non-serving cells.

17. The base station of claim 15, wherein the information comprises, for a non-serving cell of the non-serving cells, one or more of:

an indication of a cell identification of the non-serving cell, or an indication of a reception timing difference from the serving cell.

18. The base station of claim 10, wherein the one or more processors are further configured to:

transmit, to the UE, an indication to transmit uplink communications associated with the non-serving cells; and receive the uplink communications to determine the timing for the non-serving cells.

19. The base station of claim 18, wherein the one or more processors are further configured to:

transmit, to one or more base stations associated with the non-serving cells, an indication of a same timing advance to use for subsequent communications, or transmit, to one or more base stations associated with the non-serving cells, an indication to use cell-specific timing advances for the subsequent communications.

20. A method of wireless communication performed by a user equipment (UE), comprising:

transmitting, to a base station associated with a serving cell, an indication of support for simultaneously tracking timing for a first number of non-serving cells having different respective reception timings; and receiving, from the base station, an indication to track timing for a second number of the non-serving cells having different respective reception timings, the second number being less than or equal to the first number.

21. The method of claim 20, wherein the non-serving cells having different respective reception timings comprise non-serving cells having a reception timing difference from a serving cell that is larger than a cyclic prefix duration of the serving cell.

22. The method of claim 20, further comprising:

transmitting, to the base station, an indication of a reception timing difference from a non-serving cell to the serving cell that the UE supports for tracking.

23. The method of claim 20, further comprising:

transmitting, to the base station, information associated with the different reception timings of the non-serving cells.

24. The method of claim 20, further comprising:

receiving, from the base station, an indication to transmit uplink communications associated with the non-serving cells; and transmitting the uplink communications based at least in part on the different reception timings for the non-serving cells.

25. A method of wireless communication performed by a base station, comprising:

receiving, from a user equipment (UE), an indication of support for simultaneously tracking timing for a first number of non-serving cells having different respective reception timings; and transmitting, to the UE, an indication to track timing for a second number of non-serving cells having different respective reception timings, the second number being less than or equal to the first number.

26. The method of claim 25, wherein non-serving cells having different respective reception timings comprise non-serving cells having a reception timing difference from a serving cell that is larger than a cyclic prefix duration of the serving cell.

27. The method of claim 25, further comprising:

receiving, from the UE, an indication of a reception timing difference from a non-serving cell to the serving cell that the UE supports for tracking.

28. The method of claim 25, further comprising:

receiving, from the UE, information associated with the different reception timings of the non-serving cells.

29. The method of claim 25, further comprising:

transmitting, to the UE, an indication to transmit uplink communications associated with the non-serving cells; and receiving the uplink communications to determine the timing for the non-serving cells.

30. The method of claim 29, further comprising:

transmitting, to one or more base stations associated with the non-serving cells, an indication of a same timing advance to use for subsequent communications, or transmitting, to one or more base stations associated with the non-serving cells, an indication to use cell-specific timing advances for the subsequent communications.

\* \* \* \* \*